United States Patent [19]
Lawhorn

[11] 3,823,708
[45] July 16, 1974

[54] TACHYCARDIA DETECTOR
[75] Inventor: Richard D. Lawhorn, Dublin, Calif.
[73] Assignee: Cardiodynamics, Inc., Dublin, Calif.
[22] Filed: June 8, 1972
[21] Appl. No.: 260,775

[52] U.S. Cl. ........................................ 128/2.06 A
[51] Int. Cl. .......................................... A61b 5/04
[58] Field of Search...... 128/2.05 P, 2.05 R, 2.05 T, 128/2.06 A, 2.06 B, 2.06 E, 2.06 F, 2.06 R

[56] References Cited
UNITED STATES PATENTS

| | | | |
|---|---|---|---|
| 2,536,527 | 1/1951 | Appel | 128/2.05 P |
| 3,144,019 | 8/1964 | Haber | 128/2.06 A |
| 3,174,478 | 3/1965 | Kahn | 128/2.06 F |
| 3,352,300 | 11/1967 | Rose | 128/2.06 A |
| 3,438,368 | 4/1969 | Karsh | 128/2.06 A |
| 3,699,946 | 10/1972 | Michel | 128/2.06 A |
| 3,699,949 | 10/1972 | O'Hanlon, Jr. et al. | 128/2.06 A |

*Primary Examiner*—William E. Kamm
*Attorney, Agent, or Firm*—Robert G. Slick

[57] ABSTRACT

A selective circuit is provided for passing only selected waveforms of a desired polarity from a complex input waveform. The circuit is particularly adapted for use in a heart ventricular arrhythmia detector. In such a detector, it is first necessary to differentiate the abnormal negative ventricular ectopic beats from the normal negative Q & S waves. After these abnormal beats are detected, they are accumulated and, if a number of them occur within a limited period of time, an alarm circuit is actuated. One embodiment also includes means for detecting bradycardia and tachycardia. A further embodiment provides means for transmitting an ECG over the telephone.

10 Claims, 7 Drawing Figures

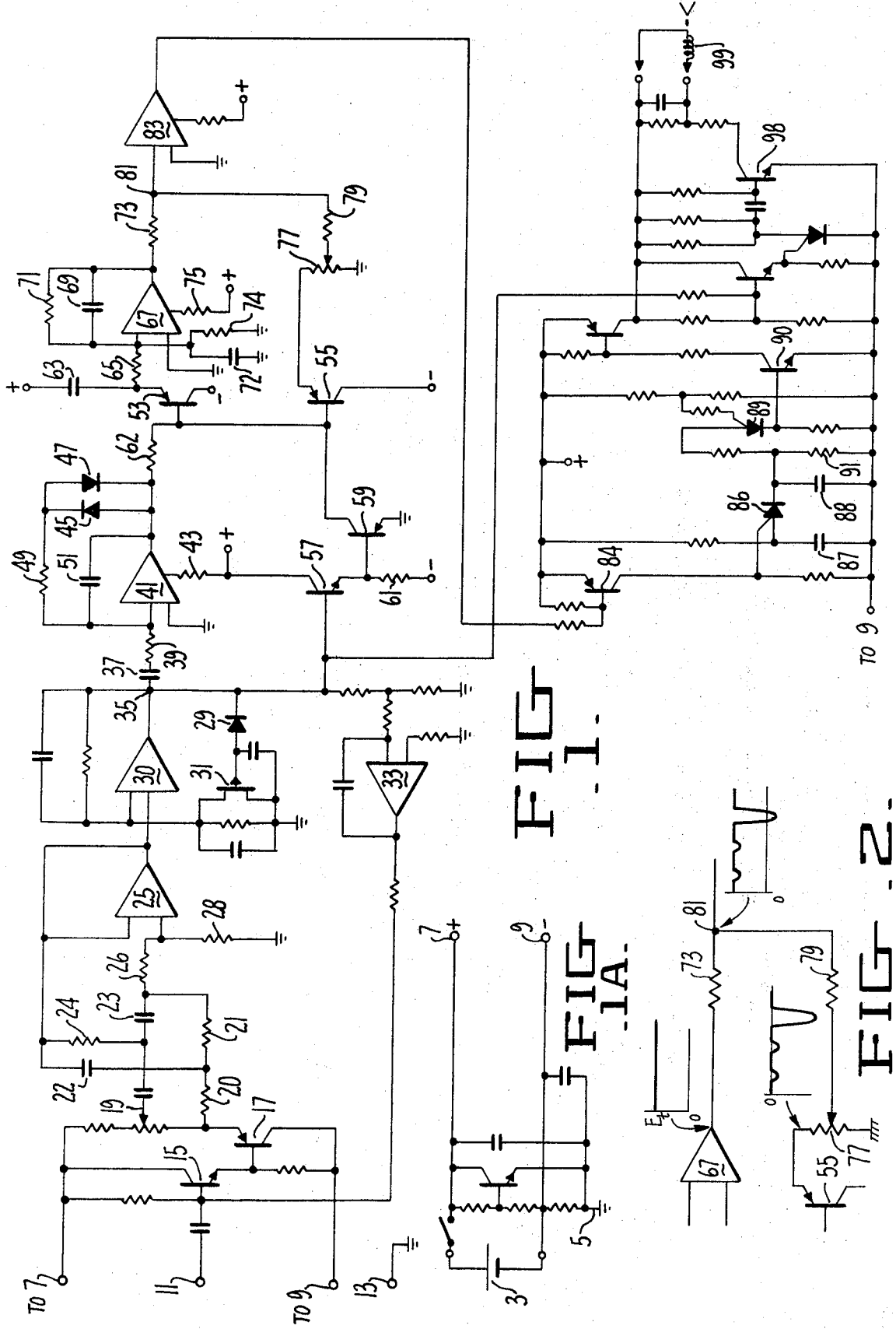

TACHYCARDIA DETECTOR

SUMMARY OF THE INVENTION

In many applications of electronics it is desired that only certain shapes of electrical waveforms be allowed to pass onto subsequent circuitry or that waveforms of certain characteristics be prevented from passing. When dealing with relatively simple waves, active or passive filters will selectively remove or pass selected frequency components. However, in the case of a complex waveform which has characteristics of time, amplitude and frequency which simultaneously occur with variable relationships, a much more difficult problem is presented. In the past, waveform pattern recognition has required a large amount of expensive equipment and resort is frequently had to digital computer systems for such waveform recognition.

In many applications such as in a heart arrhythmia detector which may be mounted on the body of an individual, it is desired to provide extremely compact equipment which has a low power drain. The present invention provides a compact circuit of low power drain of the analog type which can be adjusted to selectively pass or reject selected types of complex electrical waveforms. The circuitry of the present invention can be incorporated in a small self-contained unit which can be worn on the person of the user such as that shown in U.S. Pat. Nos. 3,138,151 and 3,547,107.

The present invention was specifically developed for the use in such a self-contained heart arrhythmia detector which can be mounted on the chest, carried in a pocket or placed on a table.

One problem in such devices is that electrical noise signals may be generated in various manners, such as by imperfect contact between the input electrodes and the skin of a wearer as well as in other manners, such as muscle tremor and, since the desired signal is extremely minute, these extraneous signals can mask the desired signal, either preventing an alarm when it should be given, or triggering a false alarm. This is undesirable, not only as a nuisance, but also because it causes misdirection of efforts in emergency situations and leads to erroneous diagnosis which can be serious to the extent of being fatal. Such electrical noise can be generated in various fashions, both within and without the body of the individual being monitored. The circuitry of the present invention makes it unlikely for the alarm to be triggered by electrical noise.

The basic circuitry can also be employed with an improved detector for sinus bradycardia and tachycardia. A further modification described permits an ECG to be transmitted by the patient over the telephone.

BRIEF DESCRIPTION OF THE DRAWING

In the drawing forming a part of this application:

FIG. 1 is a schematic diagram of an electrical circuit embodying the present invention.

FIG. 1A is a diagram of a suitable power supply.

FIG. 2 is a diagram of the waveforms present in various parts of the circuit.

DESCRIPTION OF THE PREFERRED EMBODIMENTS

Figure 3A:
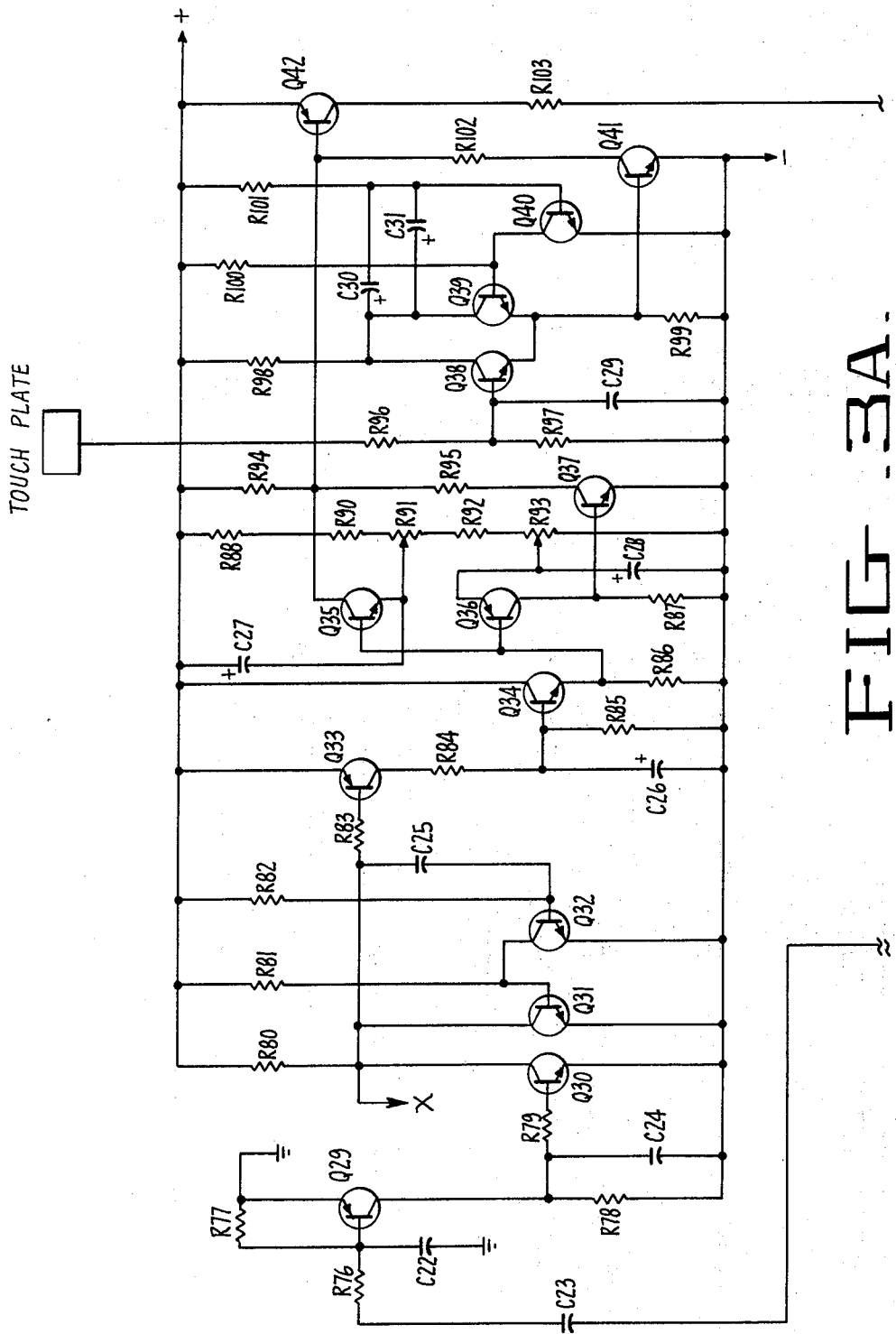
FIGS. 3A, 3B and 3C constitute is a schematic diagram of an improved apparatus which also embodies certain optional features.

The power supply shown in FIG. 1A provides a stable center tap circuit from a single voltage source 3, wherein the center is grounded as at 5 with positive and negative outputs designated 7 and 9 respectively. These voltages are applied to the circuit shown in FIG. 1 to the points indicated.

The input electrodes are connected to the circuit at the points designated 11 and 13. The electrodes may be of any conventional design, for instance, such as is shown in U.S. Pat. Nos. 3,138,151 or 3,547,107. The input is supplied to the base of a first emitter follower 15 and is further amplified through a second emitter follower 17. A filter comprising components 19 through 28 acts as a rejection notch for 60 Hz signals which might be picked up from house wiring or the like. Amplifier 25 with its associated circuitry has a gain of about 0.8 and the signal goes to a second amplifier 30 which has a gain of about 1,500. A portion of the output signal from point 35 is passed back through diode 29 and FET 31 to the inverting input of 30 and acts as an AVC for the circuit. Also, a portion of the signal is passed through integrating amplifier 33 and coupled back into the base of transistor 15 to yield DC stability for the circuit. The portion of the circuit thus far described is largely conventional for high gain circuits which are highly stable and has no frequency discrimination other than a 60 Hz notch previously described. Therefore, this circuitry has not been described in great detail.

The input signal is now at point 35 and it is selectively differentiated by capacitor 37 and resistor 39 for the lower frequency limit of interest. The upper limit of the band is controlled by the values of 37 and 39. The signal is then amplified by a high negative gain amplifier 41, biased by resistor 43. A portion of the output of amplifier 41 is fed back to the input by the non-linear network consisting of diodes 45 and 47, resistor 49 and capacitor 51. The time constant established by the value of these components establishes a roll-off point for the while negative feed-back circuit which reduces the overall amplification above the upper frequency point of interest. The diodes 45 and 47 produce offset voltages, i.e. the output of the amplifier circuit jumps through 0 volts output, thus eliminating any output between plus one-half volt and minus one-half volt. This is done to furnish the DC offset required by transistors 53 and 55. The complimentary transistor pair 57 and 59, cause the bases of transistors 53 and 55 to be grounded, and therefore carry no signal, whenever the input signal at point 35 is negative. Resistor 61 biases transistors 57 and 59 to their proper operating range. Resistor 62 limits the current supplied by amplifier 41 during the period when the bases of transistors 53 and 55 are grounded and thus allow the feed-back dynamics of amplifier 41 to function.

Transistor 53 charges the capacitor 63 to the highest negative value achieved by amplifier 41 during the period when the signal at point 35 is positive. Capacitor 63 discharges through resistor 65 to the input of amplifier 67. The values of capacitor 63 and resistors 65 are chosen so that the average current through resistor 65 is proportional to the peak values of the charge on capacitor 63 for the last several pulses. In the case of a heart arrhythmia detector these pulses result from the processing of heart beats. Amplifier 67 has a negative gain and it is provided by a feed-back circuit comprising capacitor 69 and resistor 71 wherein capacitor 69 acts as a memory to store the averages of the peak voltages which occur at the output of transistor 53. This voltage represents a positive reference threshold ($E_t$) used for later comparisons. This reference threshold voltage is then supplied to the rest of the circuitry through resistor 73. Capacitor 72 stabilizes amplifier 67 to prevent oscillation while resistor 74 supplies the base input current needed by amplifier 67 to prevent excessive DC output offsets. Bias is secured for the amplifier through resistor 75. Potentiometer 77 is driven by transistor 55 so that the voltage waveshape across this resistor is a replica of the signal from the output of amplifier 41 when the input at point 35 is positive. This potentiometer 77 is adjusted to control the amplitude of the negative going signal supplied to resistor 79 so that the resultant voltage at point 81 is the equal to weighted sum of the positive reference threshold voltage ($E_t$) supplied through resistor 73 and that supplied through resistor 79.

This relationship can best be seen by reference to FIG. 2 wherein the waveshapes at the various points are shown. At point 81 we have a positive voltage except during those short periods when there is a large negative input signal coupled out of transistor 55. The signal from point 81 is coupled to high negative gain amplifier 83. Normally the output of this amplifier is extremely negative until the input at point 81 becomes negative at which time a large positive signal is put out. This occurs when the signal from amplifier 41 is negative enough to exceed the voltage threshold ($E_t$) established by the circuitry associated with transistor 53 and amplifier 67.

In the case of arrhythmia detector, this is a detection of negative ventricular ectopic beats, discriminated from the normal PQRST electrocardiograph complex and electrical noise which can cause false indications of cardiac disturbances. In this circuit, as described above, a preamplifier has inverted the cardiac waveform so that at point 35, negative ventricular ectopic beats result in positive signals.

In an application for the detection of negative ventricular ectopic beats (with respect to the normally positive electrocardiographic waveform) it is necessary to eliminate false indications due to the normal negative Q and S components of the ECG signal. Since these occur with different amplitudes from individual to individual (particularly after suffering myocardial infarction), the compensation for this effect must be adjustable. The circuit automatically adapts itself to these varying conditions. This is accomplished by the establishment of the voltage threshold $E_t$) which is formed as described. This threshold is automatically set by the degree of negativity of the Q and S waves being received.

The positive signal from 83 is applied to the base of transistor 84 causing it to turn on programmable unijunction transistor (PUT) 86. Capacitor 87 is normally fully charged and when PUT 86 turns on, this causes capacitor 87 to transfer some of its charge onto capacitor 88. Capacitor 88 slowly discharges through resistor 91 but if the repetition rate is sufficiently high, capacitor 88 reaches a level high enough to trigger PUT 89 turning transistor 90 on, which signal is amplified and applied to sounder 99 through transistor 98. The alarm will sound for several seconds, until capacitor 88 discharges. Thus, capacitor 88 acts both as a memory of the repetition rate of the pulses and as an interval timer for the alarm.

Figure 3B:
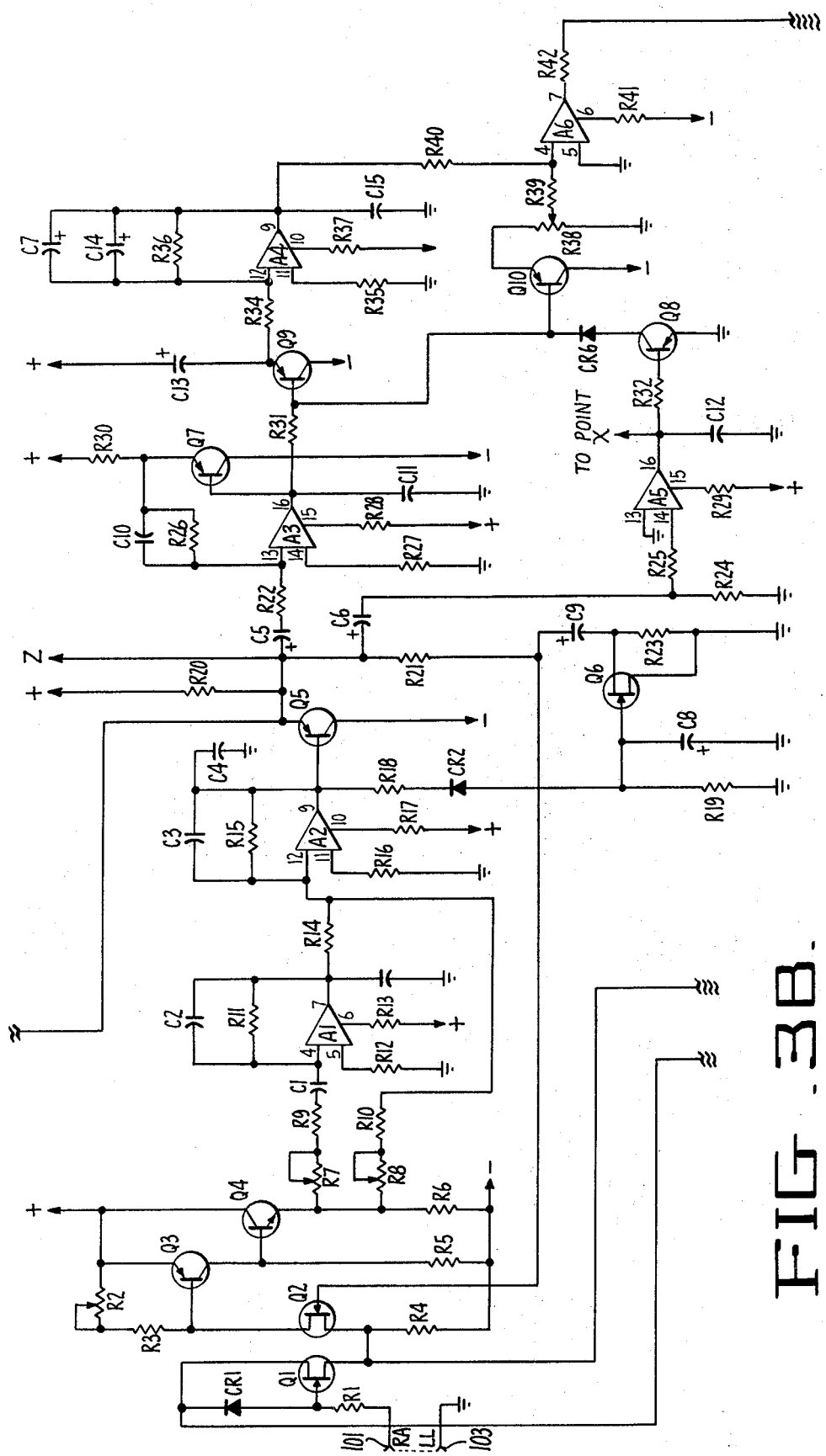
Figure 3C:
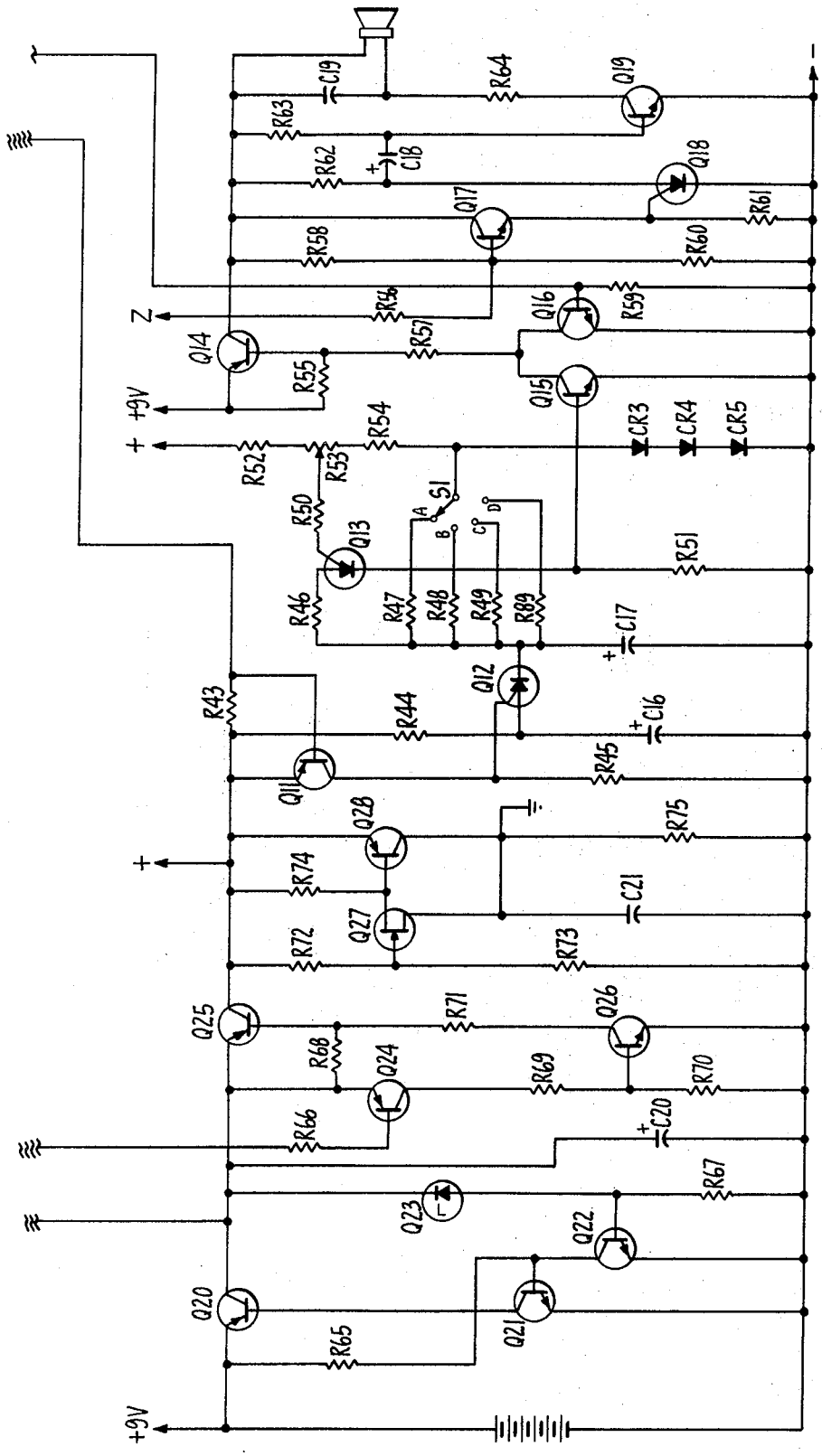

In FIGS. 3A, 3B and 3c there is shown a schematic diagram of an improved form of apparatus which not only has the features of the embodiment previously described, but also which has a number of additional features. In this embodiment of the invention an automatic switch is provided so that the device is turned on as soon as the electrodes are applied to the body of a user so that no manipulation of switches or the like on the part of the user is required. The device also includes the circuit wherein the warning signal is sounded under conditions of bradycardia or tachycardia and also a circuit whereby the user can tough a plate and produce a tone modulated electrocardiogram signal which can be transmitted by telephone for recording and diagnosis by a physician at a remote point.

Referring now to the specific circuit shown in FIGS. 3A, 3B and 3C, a power supply is employed, including transistors Q20, Q21, Q22 and Zener Q23 which produce a regulated voltage. A pair of electrodes 101 and 103 are applied to the body of the user and these lead to FET Q1. One terminal leads to the gate of Q1 while the source of Q1 is connected to the positive terminal of the power supply and also CR1. CR1 being back biased, acts as a very high impedance pullup resistor, causing FET Q1 to conduct when the electrodes are not applied to a body. When 101 and 103 are connected to the body of a user, the resistance between these terminals is greatly decreased, causing FET Q1 to become partially cut off which in turn turns on transistor Q24 and also applies the signal to FET Q2. When transistor Q24 is turned on, this activates the transistors Q25 and Q26 which act as an electronic switch, turning on the balance of the circuitry. In this way, the use of an on-off switch is eliminated, since the battery drain when the electrodes are not applied to patient, is extremely small and the battery will last substantially its shelf life. Transistors Q27 and Q28 constitute an active center tap circuit, similar to that previously described, providing voltages above and below circuit ground for the operational amplifiers which will be later described.

The signal from FET Q2 is amplified through transistors Q3 and Q4 and the voltage offset level for the input stage is set by potentiometer R2. The signal is then passed to the inverting input of operational amplifier A1.

R7, R9, C1, C2, R11, R14 all in conjunction with amplifier A1 provide a gain change and phase shift so that when the signal from A1 is combined with the direct signal through R8 and R10, any 60 Hz signal is cancelled out.

The input signal is now at point Z and it is selectively differentiated by capacitor C5 and resistor R22 for the lower frequency of interest. The upper limit of the band is controlled by the values of C10 and R26. The signal is then aplified by a high negative gain amplifier A3, biased by resistor R28. A portion of the output of amplifier A3 is fed back to the input by the network consisting of transistor Q7, resistor 36 and capacitor C10. Transistor Q7 introduces a mean offset voltage in the output of A3 so as to bias Q9 and Q10. The time constant established by R26 and C10 establishes a roll-off point for the whole negative feed-back circuit which reduces the overall amplification above the frequency point of interest. High positive gain amplifier, A5 senses the polarity of the ECG signal signal at Z and in conjunction with Q8 causes the bases of transistors Q8 and Q9 to be grounded, and therefore carry no signal, whenever the input signal at Z is negative. Resistor R31 limits the current supplied by amplifier A3 during the period when the bases of transitors Q8 and Q9 are grounded and thus allow the feed-back dynamics of amplifier A3 to function.

Figure 4:
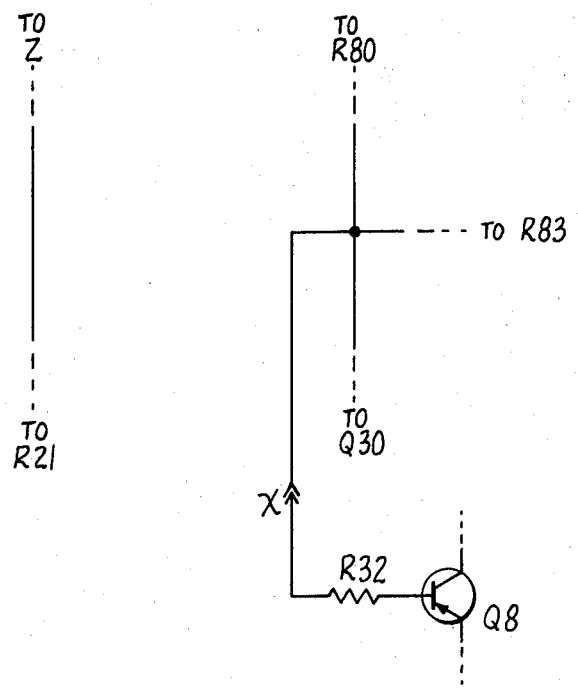
FIG. 4 is a partial schematic diagram illustrating an alternate embodiment of the invention.

An improved version of this device employs a connection from point x of FIG. 3A (the collector of Q30 and Q31) through R32 to the base of Q8 of FIG. 3B. In this version, components between R24 and C12 are not used and are disconnected. This improved version is shown in the partial schematic diagram of FIG. 4.

This interconnection inhibits any negative output from amplifier A3 to Q9 and Q11 during time of negative slope in the R-S portion of the ECG. This prevents a normal R-complex from producing outputs which may be confused with the ectopic signals which are sought.

Transistor Q9 charges the capacitor C13 to the highest negative value achieved at the output of amplifier A3 during the period when the signal at Z is positive. Capacitor C13 discharges through resistor R34 to the input of amplifier A4. The values of capacitor C13 and resistors R34 are chosen so that the average current through resistor R34 is proportional to the peak values of the charge on capacitor C13 during the last several pulses. Amplifier A4 has a negative gain and is provided with feed-back circuit comprising capacitors C7, C14 and resistor R36 wherein the capacitors act as a memory to store the averages of the peak voltages which occur at the output of transistor Q5. This voltage represents a positive reference threshold ($E_t$) used for later comparisons. This reference threshold voltage is then summed with the output from transistor Q10 in resistors R39 and R40 and fed to the inverting input of amplifier A6. Both inputs are fed through relatively high value resistors R39 and R40 and are of opposite polarity. Thus, there will be no output from amplifier A6 if the instantaneous signal pulse through the route of amplifier A5 does not exceed the average DC level established in amplifier A4 as shown in FIG. 2. However, in case there is a substantial discrepancy between the instantaneous and the average values, a voltage will be applied to the base of Q11. C16 is normally charged through R44 since it is across the power bus, but if Q11 is caused to conduct by a pulse coming from amplifier A6, PUT Q12 is caused to conduct which charges C17. If this charge is sufficiently high, it will cause Q13 to conduct which in turn will trigger Q15 which in turn will trigger the alarm, as previously described in connection with FIG. 1. Although the alarm is preferably audible, it can also be visual or tactile.

C17 has a selectable discharge path through one of resistors R47, 48, 49 and 89 and this determines the discharge time of C17 which, in turn determines the time for which the alarm will sound. The discharge path of C17 is also through the series diodes CR3, 4 and 5 so that C17 will not be completely discharged but will discharge only down to about 1 volt. The reason for this is that Q13 conducts down to about 1 volt and it is not desirable for the secondary discharge path through one of the selected resistors to cause a more complete discharge. Thus, in its low condition the charge on C17 is the same regardless of whether an alarm has just been set off, i.e. C16 has dischargd through one of the selected resistors, or whether it has been a long time since the alarm has been set off, i.e. discharge has been only through Q13. In other words, this circuitry provides that the input looks at the same condition at all times.

It was previously mentioned that optionally the circuit could include a provision for triggering the alarm under conditions of bradycardia and tachycardia. For this purpose the incoming signal is taken off at Z and amplified in transistor Q29. Transistors Q30, Q31, and Q32 constitute a one-shot multivibrator and everytime the multi-vibrator is triggered by a positive or R wave, a uniform pulse, both in height and width, is passed to transistor Q33. Transistor Q33, upon the receipt of such a pulse, conducts during a precise interval of the pulse charging C26. R85 is across C26 and causes the charge on C26 to decay. Q34 senses the condition of this charge. It will be understood that if the heartbeat is regular, the charge on C26 will be in the form of a triangular wave since it is being charged during the duration of the pulse from Q33 and discharged through R85 at all times. The time constants are so selected that the charge on C26 never goes to zero nor reaches its maximum possible charge during a series of normal heartbeats. However, if the heartbeats occur too close together, the multivibrator will be triggered more rapidly bringing the charge of 26 up to a higher than normal value, while if the pulses occur at more widely spaced intervals, the charge on C26 will drop to a low value.

As was previously mentioned, Q34 senses the value of the charge and applies it to the bases of transistors Q35 and Q36 which are of complimentary symmetry. If the charge is too high, indicating tachycardia Q35 will turn on which will in turn turn on Q42. On the other hand under conditions of bradycardia, the charge on C26 will be below the design norm, turning on Q36. This signal is fed to Q37 which inverts it and feeds it to Q42. Thus, transistor Q42 is turned on whenever the charge on C26 is above or below normal. In either case, when Q42 is turned on, the signal is applied to the base of Q16. Q15, previously described and Q16 operate as an OR gate so that the signal is passed through Q14 which again turns on the alarm as previously described. Thus, with this circuitry the patient is warned not only of ecoptic beats but also of conditions of bradycardia and tachycardia and can immediately seek relief.

The circuit also provides for a method by which the patient himself can turn on the alarm by touching a plate. Since the patient is grounded by his contact with 103, when he touches the touch plate shown, this effectively grounds the base of transistor Q38. This causes capacitors C30 and C31 to charge and also it turns on transistor Q40 which in turn turns on transistors Q39 and Q42. Capacitors C30 and C31 now slowly discharge through Q39 and when the charge has leaked off by a sufficient amount, Q41 and thus Q42 are turned off. Thus, each time the touch plate is touched, the alarm will be sounded for an interval of time depending upon the time constant, which can conveniently be about 45 seconds. While the alarm is sounding, the electrocardiogram signal as it appears at z (which it will be recalled has not been processed other tan to remove 60 Hz hum) is applied to the base of Q17 which serves to modulate the signal. Thus, a patient can telephone his doctor and then touch the touch plate and transmit to the doctor the modulated electrocardiogram signals. The doctor can, of course, record this at a remote point on suitable equipment. After an appropriate time interval, Q38 will turn off, restoring the system to its normal state.

It will be obvious that many changes can be made in the circuitry described without departing from the spirit of this invention.

I claim:

1. A heart tachycardia detector for detecting a plurality of closely occuring negative ventricular ectopic beats wherein said negative beats are discriminated from the normal PQRST electrocardiograph complex and said ventricular ectopic negative beats exceed the negativity of normal Q and S waves, comprising in combination:
   a. a pair of electrodes applied to a body,
   b. a first amplifier means connected to said electrodes, said amplifier amplifying all voltages imposed on said electrodes,
   c. a second amplifier means, said second amplifier means amplifying only negative voltages applied to said electrodes,
   d. first storage means to establish a normal threshold of negative voltage,
   e. third amplifier means for amplifying only voltages exceeding said threshold,
   f. second storage means for storing the thus amplified voltage, said second storage means having a trigger level and a discharge means, and
   g. output signal means connected to said second storage means whereby an output signal is produced only when said trigger level is reached.

2. The structure of claim 1 wherein an alarm device is provided whereby said alarm is actuated upon receipt of said signal.

3. The structure of claim 2 wherein the alarm is an audible alarm.

4. The structure of claim 2 wherein said detector includes a touch plate whereby a wearer can touch said plate and actuate said alarm, and circuit including means whereby said alarm is modulated by signals received by the electrodes.

5. The structure of claim 1 wherein a capacitor is employed as the second storage means, said capacitor having a plurality of selectable discharge paths.

6. The circuit of claim 5 wherein a first capacitor is normally fully charged and each signal impulse transfers a portion of said charge to a second capacitor, said second capacitor having a selectable discharge path and means whereby the alarm is sounded when said second capacitor is charged to a pre-established level by a succession of signals.

7. The structure of claim 1 wherein said detector includes fourth amplifier means connected to the output from said first amplifier means and wherein said fourth amplifier means includes means for detecting the frequency of positive R signals and has means for determining whether the frequency of said R signals deviate in frequency from an established value and means for producing an output signal when a deviation from said value is detected.

8. The structure of claim 7 wherein each R signal actuates a multivibrator to produce an output pulse of constant width and height and wherein said pulses are accumulated in a capacitor, said capacitor having a constant discharge path, and means whereby said output signal is actuated if the capacitor becomes discharged below a certain level or charged above a certain level.

9. The structure of claim 1 wherein said electrodes are additionally attached to an on-off circuit whereby applying the electrodes to the body of a user actuates the circuit.

10. The structure of claim 1 wherein said first amplifier has an output during the duration of a positive R wave and wherein said output of said first amplifier has means connected thereto for generating a blanking pulse during the negative slope of the RS wave, said pulse being fed to the input of said third amplifier and cutting off said third amplifier during only the period of said output.

* * * * *